Feb. 27, 1962
B. R. TEGGE ET AL 3,023,191
CONTINUOUS PROCESS FOR CHEMICALLY MODIFYING
ISO-OLEFIN-MULTIOLEFIN RUBBERY POLYMER
Filed Dec. 3, 1956
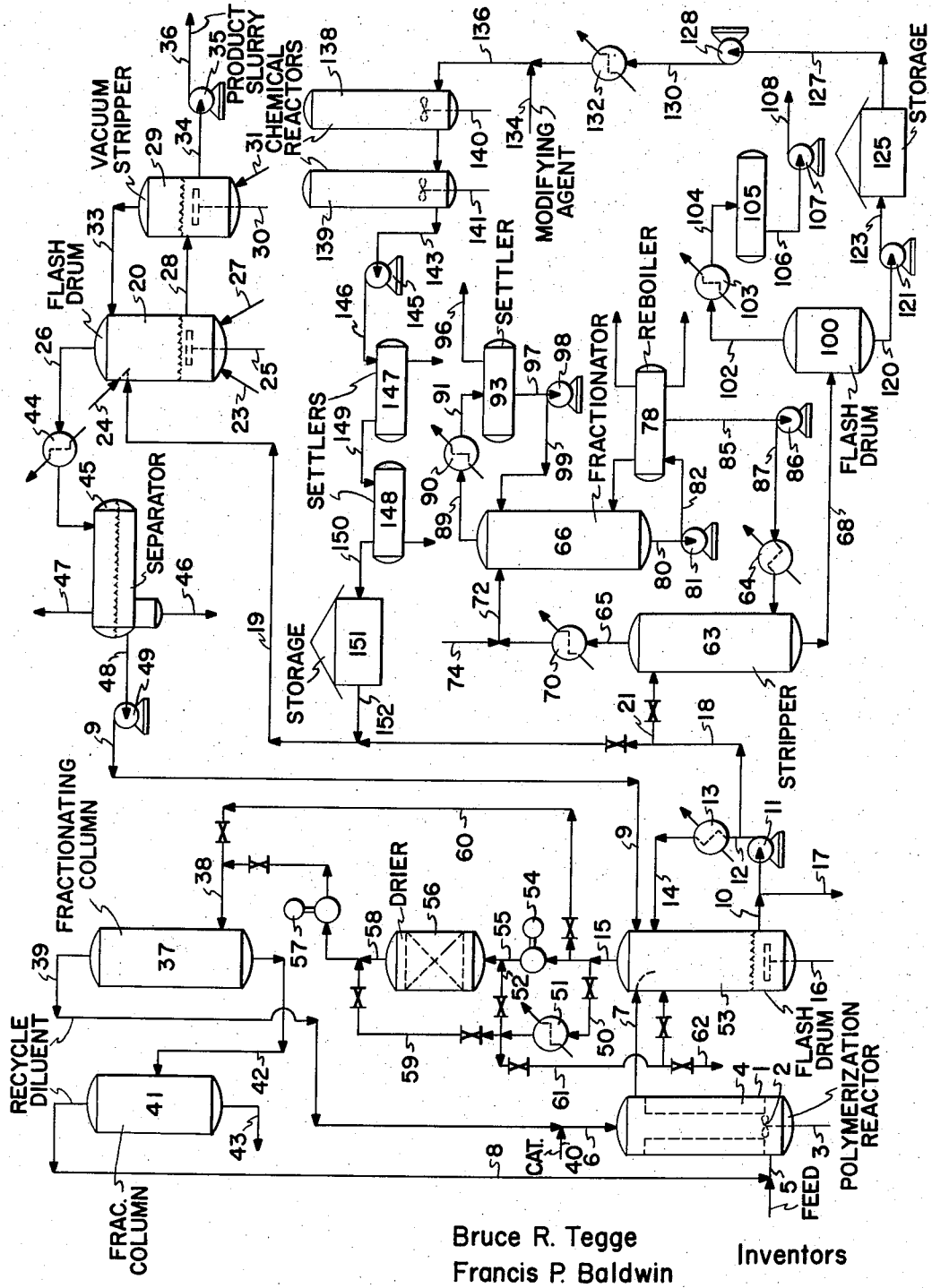
Bruce R. Tegge
Francis P. Baldwin    Inventors
George E. Serniuk
By W. H. Smyers    Attorney United States Patent Office 3,023,191
Patented Feb. 27, 1962

3,023,191
CONTINUOUS PROCESS FOR CHEMICALLY MODIFYING ISO-OLEFIN-MULTIOLEFIN RUBBERY POLYMER
Bruce R. Tegge, Madison, Francis P. Baldwin, Colonia, and George E. Serniuk, Roselle, N.J., assignors to Esso Research and Engineering Company, a corporation of Delaware
Filed Dec. 3, 1956, Ser. No. 625,637
8 Claims. (Cl. 260—73)

This invention relates to the modification of isoolefin-multiolefin-containing copolymers and, more particularly, relates to an improved process for chemically modifying isoolefin-multiolefin-containing copolymers, particularly butyl rubber or chemical derivatives of butyl rubber and similar rubbery copolymers. It also relates to certain variations of this general process, as more fully described hereinafter.

Broadly stated, the process of the present invention comprises contacting an isoolefin-multiolefin-containing copolymer, slurried in a diluent medium with at least one solvent for the copolymer at conditions adapted to volatilize diluent and dissolve at least a substantial portion of the copolymer in the solvent, and chemically modifying the copolymer in at least one reaction step while it is dissolved in the solution formed. The foregoing solution of modified copolymer may then be contacted with a hot liquid such as preheated oil to plasticize the same; or especially with large quantities of a hot aqueous medium to form a slurry of discrete particles of the modified copolymer, such as modified butyl rubber, in water. In either case, the modified copolymer may be recovered with facility by conventional filtration, extrusion and/or known drying techniques.

The invention will be best understood by the following description wherein reference will be made to the accompanying drawing in which the single FIGURE is a diagrammatic representation in the form of a flow plan depicting a typical process for the preparation, modification, and recovery of isoolefin-multiolefin-containing copolymers, such as butyl rubber, in accordance with the invention.

According to one embodiment of the present invention, isoolefin-multiolefin-containing copolymers, such as butyl rubber, are dissolved at an accelerated rate in substantially inert solvents and modified by an improved process which comprises contacting the copolymer in the form of a slurry in a reaction diluent, such as $C_1$ to $C_3$ alkyl halide, with a solvent such as a $C_6$ to $C_{10}$, preferably a $C_6$ to $C_7$ substantially saturated hydrocarbon, halogenated derivatives of such hydrocarbons, chloroform, carbon tetrachloride, carbon disulfide, etc., preferably boiling above the boiling point of the reaction diluent at conditions adapted to volatilize diluent and dissolve at least a major proportion of the copolymer in the solvent, and continuously contacting the resulting solution with one or more modifying agents such as one or more chemical reagents and/or one or more catalysts capable of modifying said copolymer, in one or more reaction steps, whereby improved, modified, copolymers are formed. The conditions employed will vary depending upon the particular diluent employed or other variables, but as a general rule, the volatilization temperature will generally be within the range of between about −50° C. and +200° C., advantageously between about −10° and +150° C., and preferably between about 20° and 100° C.

In another embodiment of the invention, rubbery isoolefin-multiolefin-containing copolymers are dissolved in substantially inert solvents, modified in solution and thereafter preferably recovered in suspension. This is accomplished by contacting the solution of modified copolymer, formed in accordance with the present invention, with at least one non-solvent liquid medium such as alcohols, ethers, ketones or the like, or especially with an aqueous medium, preferably boiling above the boiling point of the solvent, at conditions adapted to volatilize substantially all of the solvent and form an improved slurry of discrete particles of modified copolymer in the non-solvent medium such as water.

The solutions of modified copolymer, formed in accordance with the present invention, generally contain about 2 or 5 to about 20 wt. percent of modified copolymer and may be readily processed to form concentrates, rubber cements and the like. The resulting solution of modified copolymer may be completely or partially freed of solvent by such means as flashing, and/or drum driers, spray driers, degassing extruders, etc. Alternatively, the modified copolymer may be recovered from solution by contacting the latter with a hot non-solvent liquid such as water to drive off the solvent and form discrete particles of modified copolymer in the liquid. The copolymer may be recovered free of both solvent and non-solvent liquids by drying means of the type just mentioned.

In still another embodiment of the present invention, modified isoolefin-multiolefin-containing copolymers are produced by regulating the copolymerization pressure to between about 10 and about 250 p.s.i.a. and carrying the copolymerization reaction to substantial completion in the presence of a $C_1$ to $C_3$ alkyl halide diluent such as methyl chloride. The reaction mixture containing the copolymer is then injected into a zone where it is contacted with an inert copolymer solvent, preferably a $C_5$ to $C_{10}$ hydrocarbon, the temperature and volume of solvent being sufficient to volatilize substantially all of the alkyl halide diluent (advantageously by flashing), under the particular pressures employed, and dissolve the copolymer in the solvent. Also, in order to provide a driving force between the reactor and the flashing zone, it is desirable to operate this zone under pressures between about 5 and 200 p.s.i.a., but between about 2 or 5 to 50 p.s.i.a. below the pressure maintained in the polymerization zone. It is also within the purview of the present invention to regulate the alkyl halide vaporization pressure to say between about 15 and 200 p.s.i.g., so as to permit the condensation of the vaporized alkyl halide diluent by cooling tower water. In all instances, the copolymer-containing solution formed may be contacted with a solution of the modifying agent in one or more reaction steps, as more fully described hereinafter.

It is within the purview of the present invention to contact rubbery copolymers which have been produced by copolymerization in the presence of at least one non-solvent liquid diluent for the copolymer, with a first copolymer solvent boiling above the diluent at conditions adapted to volatilize diluent and dissolve copolymer in the first solvent, chemically modifying the copolymer with a first modifying agent while the copolymer is dissolved in the first solvent, optionally replacing at least a portion of the first solvent with a second copolymer solvent at conditions adapted to volatilize said first solvent, and further chemically modifying the chemically modified copolymer with a second modifying agent while the chemically modified copolymer is dissolved in the first and/or second copolymer solvent. Also, the first-mentioned copolymer may optionally comprise a copolymer which has been chemically modified by processes other than the process of the present invention, such as during the copolymerization stage. This chemically modified copolymer is then further modified, in accordance with the present invention, while it is dissolved in a solvent or solvents, in one or more reaction steps, as outlined above, and as disclosed hereinafter in the specification and claims.

The solution of polymer to be modified (such as butyl rubber) is preferably substantially free of unsaturated materials other than the polymer. If such unsaturates as olefins are present (e.g., unreacted monomers) the chemical material reacting with the polymer may also react with the unsaturates. In many instances, this causes relatively high modifying agent consumption, and in all instances greatly complicates the separation and recycle of unmodified monomers to the reactor. Also, many reaction products of chemicals with isoolefins and multiolefins or other unsaturated materials present create serious corrosion problems in the recycle streams. Accordingly, the solution of polymer to be continuously modified is freed of any substantial quantities of unsaturated materials other than the polymer. This is preferably accomplished by providing a stripping means for removing the unsaturates such as olefins between the diluent flash step and the modification reaction step, as will be more fully described hereinafter. Alternatively, the polymerization reaction may be carried out at a high conversion level, e.g., about 95 to 99.5 wt. percent (instead of the usual conversion level, say about 50 to 80 wt. percent) so as to minimize the quantity of unreacted monomers retained in the solution leaving the diluent flash zone. In still another variation, the diluent flash zone is maintained at a sufficiently high temperature and/or a sufficiently low pressure (for any given volume ratio of liquids involved) to volatilize substantially all of the unreacted monomers together with the diluent. In this case, it is preferred that the solvent boil at a relatively high temperature whereby sufficient solvent is retained to maintain the polymer in solution after the removal of other unsaturated materials.

Accordingly, the preferred embodiment of the invention comprises an improved process for continuously modifying copolymers such as butyl rubber and recovering modified butyl rubber or similar materials wherein a reactor effluent comprising butyl rubber slurried in a $C_1$ to $C_3$ alkyl halide diluent is contacted in a flash zone with a sufficient amount of substantially inert solvent such as a $C_5$ to $C_{10}$ hydrocarbon, boiling above the boiling point of the diluent and at conditions adapted to volatilize sufficient diluent to dissolve substantially all of the butyl rubber in the solvent. The diluent vapors are then condensed, and recycled in liquid form to the reactor, the unsaturated materials other than the polymer being then stripped from the reaction mixture. Thereafter, the resulting butyl rubber solution is contacted under reaction conditions with one or more chemical agents and/or catalysts capable of modifying the butyl rubber in solution, and then contacted with an aqueous medium under conditions adapted to volatilize substantially all of the solvent and form a slurry of modified butyl rubber in water. The solvent vapors formed are then condensed and recycled in liquid form to the flash zone and the modified butyl rubber product subsequently recovered from the reaction mixture as will be more fully described hereinafter.

For the purposes of the present invention, the non-solvent liquid polymerization diluent is preferably an alkyl halide diluent and especially an unreactive $C_1$ to $C_3$ alkyl chloride or fluoride which is a solvent for the monomer and catalyst but a non-solvent for the rubbery polymer at polymerization conditions and which does not form a complex with the catalyst. Suitable diluents falling within the foregoing class of alkyl halides are methyl chloride, methylene chloride, ethyl chloride, ethylene chloride, methyl fluoride, ethyl fluoride, ethylene fluoride, 1-fluoro-2-fluoroethane, 1-fluoro-2,2'-difluoroethane, perfluoropropane, etc. The alkyl chlorides preferably contain one to two carbon atoms whereas the preferred alkyl fluorides contain one to three carbon atoms. Methyl fluoride and, for economic reasons, even more especially methyl chloride are the preferred alkyl halides.

Suitable solvents, for replacing the alkyl halide diluent in accordance with the invention, include substantially inert $C_5$ to $C_{10}$, advantageously $C_5$ to $C_8$, preferably $C_6$ to $C_8$ saturated hydrocarbons or halogenated derivatives of hydrocarbons such as normal or iso-paraffins including n- and iso-pentane, cyclo and methylcyclopentane, hexane, heptane, octane, isohexane, isooctane; naphthenes such as cyclohexane and methylcyclohexane; aromatic hydrocarbons such as benzene, toluene and xylenes; acid treated and/or hydrogenated hydrocarbon fractions (such as naphthas, gasolines, mineral spirits or the like), hydrogenated very light fractions of cracked gas oils or kerosenes, toluene, naphthalene, chlorobenzene, chloroform, trichloroethane, carbon tetrachloride, carbon disulfide; mixtures thereof, etc. The preferred solvents are pentanes, heptanes, hexanes, iso-octane, cyclohexane, benzene, hydrogenated naphthas and hydrogenated gasolines or the like.

The rubbery isoolefin-multiolefin-containing copolymers suitable for use in accordance with the present invention are preferably rubbery interpolymers of one or more $C_4$ to $C_8$ isoolefins and one or more $C_4$ to $C_{14}$ multiolefinic hydrocarbons such as diolefins, triolefins, or other olefinic hydrocarbons containing more than one olefinic double bond. Certain of these rubbery interpolymers are characterized by a medium to high molecular weight, relatively low unsaturation, and at least partial reactivity with sulfur at elevated temperatures to yield an elastic product by known vulcanizing or curing techniques of the types useful in curing butyl rubber.

Among the abovementioned class of isoolefin-multiolefin-interpolymers are, for example, copolymers containing a major proportion, advantageously to about 85 to 99.5 wt. percent of an isoolefin of about 4 to 7 carbon atoms such as isobutylene, 2-methyl-1-butene, 3-methyl-1-butene, 4-methyl-1-pentene, 2-ethyl-1-butene, 4-ethyl-1-pentene or the like, or a mixture of such olefins, and a minor proportion, advantageously from about 0.5 to 15 wt. percent of a multiolefin containing about 4 to 14, preferably 4 to 6 carbon atoms or two, three or more of such multiolefins including the following:

(1) Acyclic or open-chain conjugated diolefins such as 1,3-butadiene; isoprene; 2,4-dimethyl-1,3-butadiene; piperylene; 3-methyl-1,3-pentadiene; hexadienes; 2-neopentyl-1,3-butadiene and the like;

(2) Alicyclic diolefins, both conjugated and non-conjugated, such as cyclopentadiene, methyl cyclopentadiene; dicyclopentadiene, cyclohexadiene; 1-vinyl-3-cyclohexene; 1-vinyl-1-cyclohexene; 1-vinyl-1-cyclopentene; 1-vinyl-2-cyclobutene; dimethyl dicyclopentadiene and the like, as well as monocyclic diolefinic terpenes such as dipentene, terpinenes, terpinolene, phellandrenes, sylvestrene, etc.

(3) Acyclic triolefins such as 2,6-dimethyl-4-methylene-2,5-heptadiene; 2-methyl-1,3,5-hexatriene and other conjugated triolefins, as well as myrcene, ocimene, allo-ocimene and the like;

(4) Alicyclic triolefins such as fulvene, 6,6-dimethyl fulvene; 6,6-methyl ethyl fulvene; 6-ethyl fulvene; 6,6- diphenyl fulvene; 6-phenyl fulvene; and other fulvenes of the formula

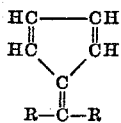

wherein R is hydrogen, alkyl, cycloalkyl, aryl, aralkyl or alkaryl; as well as other alicyclic triolefins such as 1,3,3-trimethyl-6-vinyl-2,4-cyclohexadiene; cycloheptatriene, etc.; and (5) Higher multiolefins such as 6,6-vinyl methyl fulvene (a tetraolefin) and 6,6-diisopropenyl fulvene (a pentaolefin) or the like.

Similar copolymers containing small amounts, e.g., about 0.05 to 5.0%, preferably 0.2 to 1.0% of cross-linking agents, such as divinyl benzene, divinyl naphthalene, dimethylallyl, etc., may be used.

One particularly advantageous rubbery isoolefin-multiolefin-containing type of copolymer is butyl rubber. Processes for preparing butyl rubber are disclosed in U.S. Patent 2,356,128, in textbook "Synthetic Rubber" by G. S. Whitby, etc. In general, such processes, have involved the copolymerization of the above monomers in the presence of a Friedel-Crafts catalyst such as an aluminum halide (e.g. aluminum chloride), titanium tetrachloride, boron trifluoride, uranium chloride, aluminum ethoxy-chloride, etc., preferably dissolved in an inert diluent at temperatures between about $+30°$ to $-330°$ F. (i.e., $0°$ to $-200°$ C.) and preferably between about $0°$ and $-200°$ F. (i.e., about $-20°$ to $-130°$ C.). When the copolymer contains about 90 to 99.5 wt. percent of the isoolefin and about 0.5 to 10 wt. percent of the multiolefin, rubbery products are formed which have Staudinger molecular weights between about 20,000 to 300,000, i.e., viscosity average molecular weights between about 200,000 up to 2,000,000 or 3,000,000. The iodine numbers (Wijs) of the resulting rubbery polymers are generally between about 0.5 and 50 cg./g., preferably between about 1.0 and 20 cg./g.

Other suitable isoolefin-multiolefin copolymers, which are advantageously processed and modified in accordance with the present invention, comprise copolymers prepared from feeds composed of about 50 to 100 parts by weight of a $C_4$ to $C_{14}$ multiolefin such as a $C_4$ to $C_{10}$ conjugated diolefin with about 100 parts by weight of a $C_4$ to $C_8$ isoolefin such as isobutylene or 2-methyl-1-butene. These copolymers have utility in rubber compounding, cements, etc. Such copolymers generally have iodine numbers between about 30 and 100 (Wijs). Still another class of isoolefin-multiolefin copolymers comprises copolymerization products formed from feeds comprising about 100 to 800 parts by weight of a $C_4$ to $C_{14}$ multiolefin with about 100 parts by weight of a $C_4$ to $C_8$ isoolefin. These copolymers generally have iodine numbers between about 100 and 175 and are useful in rubber cements and as V.I. additives for mineral lubricating oils.

It is also within the purview of the present invention to process and modify, in accordance with the present invention, tripolymers of isoolefins, multiolefins and monoolefinic compounds containing an aromatic nucleus such as styrene, alpha methyl styrene, p-methyl styrene, indene, dihydronaphthalene, p-chlorostyrene, dichlorostyrene, mixtures thereof, etc. The amount of the monoolefinic compound employed is in a minor proportion based on total reacting monomers and is preferably employed in amounts such that between about 0.05 and 10.0, and even more especially between about 0.5 and 5.0 wt. percent of the monoolefinic aromatic compound is combined in the resulting copolymer.

A particularly outstanding copolymer modification process which may be performed in accordance with the invention is the partial chlorination of isoolefin-multiolefin rubbery copolymers. This modification process involves intimately contacting the copolymer solution formed by replacing the non-solvent polymerization diluent with a higher boiling copolymer solvent, at copolymer chlorination conditions, with a chlorinating agent as hereinafter more fully described. The chlorination is preferably carried out to an extent which does not substantially degrade the molecular weight of the copolymer but sufficient to produce a rubbery copolymer which retains its tensile strength upon heat aging. For this purpose, the chlorination is carried out so as to make the resulting chlorinated copolymer contain about at least 0.5 wt. percent (preferably at least about 1.0 wt. percent) combined chlorine, but not more than about "X" wt. percent combined chlorine wherein:

$$X = \frac{35.46L}{(100-L)M_1 + L(M_2+35.46)}(100)$$

and:

$L$=mole percent of the multiolefin in the polymer
$M_1$=molecular weight of the isoolefin
$M_2$=molecular weight of the multiolefin
35.46=atomic weight of chlorine Restated, there should be at least about 0.5 and preferably at least about 1.0 wt. percent of combined chlorine in the polymer but not more than about one atom of chlorine combined in the polymer per molecule of multiolefin present therein; i.e., not more than about one atom of combined chlorine per double bond in the polymer. For certain uses, for example, in cements, the amount of the combined chlorine content may be between about 0.05 "X" and 1.5 "X" weight percent based on the above formula.

Suitable chlorinating agents which may be contacted with the copolymer solutions of the present invention are gaseous chlorine, alkali metal hypochlorites (preferably sodium hypochlorite), alkyl hypochlorites (preferably $C_4$ to $C_{10}$ tertiary alkyl hypochlorites), sulfur chlorides (particularly oxygenated sulfur chlorides), sulfur chloride perchloride, N-chlorosuccinimide, alpha-chloro-acetoacetanilide, N,N'-dichloro-5,5'-dimethylhydantoin, tri-chlorophenol chloride, N-chloroacetamide, beta-chloro-methyl phthalimide, and other common chlorinating agents. The preferred chlorinating agents are gaseous chlorine, sulfuryl chloride, chlor-hydantoins, and related chlorine-containing materials.

Intimate contact between the copolymer solution may be achieved by passing finely divided streams of gaseous chlorinating agent through the solution or mixing the solution with liquid or solid chlorinating agents, preferably in comminuted form. Chlorination, in accordance with the invention, takes place essentially by substitution of hydrogen atoms by chlorine atoms rather than by addition of chlorine to the double bonds of the copolymer. This is demonstrated by the fact that when gaseous chlorine is used as the chlorinating agent, one mole of hydrogen chloride is evolved for each chlorine atom entering the copolymer molecule.

The chlorination is conducted at temperatures of above 0° up to about 100° C., advantageously at about 10° to 65° C. (room temperature being satisfactory), depending upon the particular chlorinating agent, for about one minute to several hours. An advantageous pressure range is from about 0.1 to 1,000 p.s.i.a., or even more especially about 0.5 to 500 p.s.i.a.; atmospheric pressure being satisfactory. The chlorination conditions are regulated to chlorinate the dissolved rubbery copolymer to the extent above-mentioned. For example, if the butyl rubber corresponds approximately to GR-I-18 rubber (i.e. a Mooney viscosity at 212° F., for 4 minutes of 75 and a mole percent unsaturation of about 1.4), it is preferably chlorinated to contain about 0.3 to 2.5%, advantageously about 0.5 to 2%, preferably about 0.8 to 1.8% combined chlorine.

The concentration of the butyl rubber in the solvent will depend upon the type of chlorination reactor, molecular weight of the butyl rubber, etc. In general, the concentration of a butyl rubber having a viscosity average molecular weight of about 50,000 to about 2,000,000 preferably about 200,000 to about 1,500,000 if the solvent is a substantially inert hydrocarbon, will be between about 1 and 80%, advantageously between about 3 and 50%, preferably between about 5 and 30% by weight. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting chlorinated isoolefin-multiolefin-containing copolymer, particularly chlorinated butyl rubber, is then recovered in accordance with the present invention by injecting the chlorinated butyl rubber solution into a vessel containing agitated water heated to a temperature sufficient to flash off the hydrocarbon solvent and form an aqueous slurry of the chlorinated butyl rubber. The chlorinated butyl rubber may then be separated from this slurry by filtration, dried and recovered as a "crumb" or as a dense sheet or slab by conventional milling and/or extruding procedures.

As so produced, the chlorinated rubbery copolymer generally has a Staudinger molecular weight, within the range between approximately 10,000 to 150,000, advantageously about 20,000 to 100,000, the preferred range being between about 30,000 and 80,000. The chlorinated material also generally has a Wijs iodine number between about 0.5 or 1.0 and a maximum of about 50, although the preferred iodine number is usually between about 1 and 15.

The chlorinated copolymer formed desirably has a mole percent unsaturation between about 0.2 to 15, preferably 0.5 to 10, and even more especially 0.6 to 5.0. This copolymer, when cured, has a good elastic limit, tensile strength, abrasion resistance and flexure resistance and may be employed as an inner lining, tie ply, tread or sidewall in tires; in tire curing bags or bladders, in rubber belting, as electrical insulation, etc.

Brominated isoolefin-multiolefin-copolymers such as brominated butyl rubber may also be produced in solution in accordance with the present invention by reacting the dissolved rubbery copolymer with bromine or suitable bromine-containing compounds so that the polymer contains at least about 0.8 wt. percent of combined bromine but not more than about 2 or 3 atoms of bromine combined in the polymer per molecule of multiolefin present therein; i.e., not more than about 3 and preferably not more than about 2 gram atoms of combined bromine per mole of carbon to carbon double bonds in the polymer. Suitable brominating agents which may be employed are molecular bromine, alkali metal bromites, sulfur bromides, N-bromosuccinimide, alpha-bromoacetanalide, bromo hydantoins such as N,N'' dibromo-5,5'-dimethyl hydantoin, tribromo phenol bromide, N-bromo acetanilide, beta-bromo-methyl phthalimide, etc. The bromination is advantageously conducted at about −50° to +150° C., preferably at about −20° to +120° C. for about one minute to several hours. The temperatures and times are regulated to brominate the rubbery copolymer to the extent abovementioned. The pressure may vary from about 1 to about 400 p.s.i.a., atmospheric pressure being satisfactory. The bromination is accomplished by preparing a solution of the copolymer in a substantially inert solvent, the solution being formed by replacing the non-solvent polymerization diluent in accordance with the present invention, and intimately mixing therewith under copolymer bromination conditions, liquid bromine or other brominating agent which may be optionally dissolved in an inert hydrocarbon, alkyl halide, carbon tetrachloride, etc.

It is also within the purview of the present invention to dissolve isoolefin-multiolefin-containing copolymers, such as butyl rubber, in substantially inert solvents, in accordance with the present invention, and after a mild chlorination and/or bromination, as outlined above, further chemically modifying the dissolved halogenated rubber by reaction (at temperature levels between about 0° and 150° C. or preferably between about 30° and 100° C.) with about 0.2 to 2.0 moles per mole of halogen combined in the polymer of certain polyfunctional compounds containing, in addition to amino and/or imino groups, other functional groups to produce improved modified copolymers exhibiting increased resistivity and tensile strength upon vulcanization. The polyfunctional compounds may be derived from aliphatic, aromatic, naphthenic or heterocyclic compounds (optionally having such groups as: alkyl, alkaryl, aryl, aralkyl, alkenyl, aralkenyl, alkenaryl, etc.) or related materials. Such polyfunctional compounds advantageously contain at least one —$NH_2$ and/or at least one —NH— group and, in addition thereto, at least one other functional group such as hydroxy, carboxyl, carbonyl, nitro, nitroso, cyano, amido, azo, acyl, aroyl, acyloxy, halo, sulfonic acid, sulfonyl halide, etc.

Typical polyfunctional compounds of the foregoing categories suitable for the purpose of chemically modifying butyl rubber, in accordance with the invention, include the following or their equivalent:

p-Aminophenylacetate;
p-aminonitrosobenzene;
p-aminoacetanilide;
p-aminoacetophenone;
p-aminoazobenzene;
p-aminobenzoic acid;
p-aminobenzonitrile;
2-aminobiphenyl;
4-aminobiphenyl;
2-amino-4-chloro-toluene;
5-amino-1-naphthol;
4-amino-3-nitrobiphenyl;
2-amino-4-nitrophenol;
o,m, and p-aminophenol;
p-aminophenylacetic acid;
p-aminophenylacetonitrile;
2-amino-4-phenylphenol;
p-aminopropiophenone;
4-aminoacetophenone;
4-chloroaniline;
4-nitroaniline;
2-amino-3-methyl pyridine;
2-amino-4-methyl pyridine;
2-amino-5-methyl pyridine;
2-amino-6-methyl pyridine;
2-amino pyridine;
3-aminoquinoline;
8-aminoquinoline;
ethanolamines;
glycine;
beta-alanine;
4-nitrobenzylamine;
beta-aminopropionitrile;
alpha-aminoacetamide;
m-(p-anilinophenylazo) benzenesulfonic acid;
beta-chloroethylamine;
p-aminobenzene sulfonic acid;
N-methyl-p-aminophenylacetate;
N-methyl-anthranilic acid;
N-methyl-sulfanilic acid;
N-methyl-p-aminophenylacetate;
N-ethyl-p-aminonitrosobenzene;
N-methyl-p-aminoacetanilide;
N-methyl-p-aminoacetophenone;
N-propyl-p-aminoazobenzene;
N-methyl-p-aminobenzoic acid;
N-isopropyl-p-aminobenzonitrile;
2-methylamino biphenyl;
4-ethylaminobiphenyl;

2-methylamino-4-chlorotoluene;
5-methylamino-1-naphthol;
4-iso-octylamino-3-nitrobiphenyl;
2-methylamino-4-nitrophenol;
o,m, and p-methylaminophenol;
p-methylamino-phenylacetic acid;
p-methylaminophenylacetonitrile;
2-methylamino-4-phenyl phenol;
p-isopropylamino-propiophenone;
4-chloro-N-methylaniline;
4-nitro-N-methylaniline;
N-nitroso-p-nitroso-N-alkyl anilines;
2-methylamino-3-methylpyridine;
2-ethylamino-4-methyl pyridine;
2-hexylamino-5-methyl pyridine;
2-methylamino-6-methyl pyridine;
2-methylaminopyridine;
3-methylaminoquinoline;
8-heptylaminoquinoline;
N-methyl ethanolamines;
N-methyl glycine;
N-methyl beta-alanine;
N-methyl-4-nitro-benzylamine;
beta-ethylaminopropionitrile;
etc.

While the preferred halogenating agents are liquid bromine, and especially gaseous chlorine, as described above, the present invention is also useful for modifying isoolefin-multiolefin-containing copolymers, particularly butyl rubber with fluorine and/or iodine and/or suitable compounds containing these halogens. Also, combinations of any of the foregoing four halogens or halogenating agents may be used. For instance, brominated butyl rubber may be chlorinated and chlorinated butyl rubber may be brominated in solution, in accordance with the present invention. In a like manner, iodine chloride is of utility in modifying butyl rubber, and chlorinated or brominated butyl rubber, etc. Furthermore, these halogenated rubbers obtained may be further chemically modified with polyfunctional amino and/or imino compounds such as described above or with alkyls or alkoxides of such metals as aluminum, titanium and zinc (e.g., aluminum alcoholates), as well as the other chemical compounds more fully described hereinafter with reference to their modification of unmodified butyl rubber.

Isoolefin-multiolefin-containing copolymers are also advantageously dissolved and modified by reaction in solution, in accordance with the present invention, with about 0.05 to 10.0 wt. percent based on rubber of an aromatic nitroso compound containing at least two functional substituents including the nitroso substituent. Such aromatic nitroso compounds preferably contain as a first substituent a nitroso group directly attached to the aromatic nucleus and at least one other functional substituent containing at least one member selected from the group consisting of oxygen, nitrogen and halogen, the last-named functional substituent also containing at least one non-functional substituent such as alkyl aryl aralkyl and/or alkaryl groups. Typical aromatic nitroso compounds falling within this definition include among others; p-nitrosophenol, N-substituted-p-nitroso-anilines such as N-nitroso-p-nitroso-$C_1$-$C_5$ alkyl anilines, nitrosobenzaldehydes, nitrosocresols and the like.

A particularly outstanding group of such materials include those compounds coming within the general formula $$ON-Q-M_mY$$

in which Q is selected from the group consisting of mono and polynuclear aromatic hydrocarbon or heterocyclic nuclei, M being an aliphatic bivalent hydrocarbon group having a formula selected from the group consisting of $C_nH_{2n}$ and $C_nH_{2n-2}$, n being an integer of between about 1 to 10, m being between about 0 to 10, Y being selected from the group consisting of OR, COOR, X, CN, $NO_2$, $NR_2$ and

wherein R is a $C_1$ to $C_{24}$ alkyl, aryl, alkaryl, cycloalkyl or aralkyl group and X is halogen (preferably chlorine or bromine).

Typical compounds falling within the above-mentioned formula include: p-nitrosophenol methyl ether, m-nitrosophenyl cyclo hexylene, p-nitrosobenzyl alcohol, nitrosobenzyl ethyl ether, p-nitrosochlorobenzene, o,p-nitroso dichlorobenzene, p-nitroso cyanobenzene, p-nitroso-nitrobenzene, m-nitroso nitrobenzene, p-nitrosoaniline, p-nitrosotoluidine, p-nitrosoxylidine, p-nitrosodimethylaniline, N-nitroso-p-nitrosomethylaniline, m-nitrosodiethylaniline, N-nitroso-p-nitroso-ethylaniline, N-4-dinitroso-N-hexylaniline, diphenyl nitrosoaniline, methylphenylnitrosoamine, N-N'-dimethyl-N-N'-dinitroso benzidine, N-N'-dimethyl-N-nitroso naphthylamines, 4,-nitro-2-methyl-N-nitrosoaniline, N,p-dinitroso-N-ethylaniline, N-nitroso-4-nitrosobenzylamine, N-nitroso-beta-alanine, nitrosopyridines, nitrosoquinolines, nitrosoxylylenimine, N,N'-dinitroso uretidine, etc.

The foregoing nitroso compounds are advantageously reacted with the dissolved isoolefin-multiolefin copolymer at a temperature level between about 200° and 400° F., preferably between about 250° and 350° F. by intimate contact for times between about one minute to 2 hours or more. It has been found that rubber vulcanizates of such modified copolymers as above exhibit improved extension modulus and resistivity.

In another embodiment of the present invention, isoolefin-multiolefin copolymers, particularly butyl rubber, are improved as to resistivity, modulus and tensile strength by reacting the copolymer in solution, in accordance with the invention, with a minor proportion of an azocarboxylated hydrocarbon such as a $C_1$ to $C_{18}$ alkyl or cycloalkyl or a $C_6$ to $C_{18}$ aryl, aralkyl or alkaryl azomonocarboxylate and/or azodicarboxylate.

One class of azocarboxylate compounds, suitable for use in accordance with the present invention, belong to the group of azomonocarboxylate compounds having the general formula

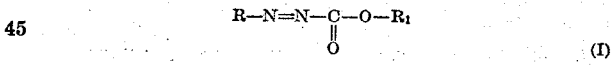

(I)

wherein R and $R_1$ are $C_1$ to $C_{12}$ alkyl, $C_3$ to $C_{12}$ cycloalkyl, or $C_6$ to $C_{24}$, preferably $C_6$ to $C_{18}$, aryl, aralkyl or alkaryl groups. Typical azomonocarboxylate compounds falling under the above formula are ethyl phenylazocarboxylate, phenyl hexylazocarboxylate, ethyl iso-octylazocarboxylate, ethyl naphthalene azocarboxylate, ethyl azoacetic acid carboxylate, ethyl-2,4-dinitrobenzene azocarboxylate, cholorethyl diphenyl azocarboxylate and ethyl dimethylpyrazole azocarboxylate.

Another type of azo-compounds suitable for use in accordance with the present invention is azodicarboxylate compounds having the general formula

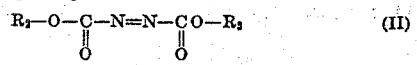

(II)

wherein $R_2$ and $R_3$ are $C_1$ to $C_{18}$, preferably $C_1$ to $C_{12}$ alkyl, $C_3$ to $C_{12}$ cycloalkyl or $C_6$ to $C_{24}$, preferably $C_6$ to $C_{18}$ aryl, aralkyl or alkaryl groups. Typical azodicarboxylate compounds falling under the last-mentoined formula are ethyl azodicarboxylate, phenylazodicarboxylate, isopropylazodicarboxylate, ethylphenylazodicarboxylate, dodecylazodicarboxylate, 2,4-dinitrophenylazodicarboxylate, cresylazodicarboxylate, eugenolazodicarboxylate, beta-naphthylazodicarboxylate, methylsalicylazodicarboxylate, thiophenylazodicarboxylate, salicylaldehydeazodicarboxylate, chloroethylazodicarboxylate, ethylene glycolazodicarboxylate, and chloroethylphenylazodicarboxylate.

In practicing this particular process, an isoolefin-multiolefin copolymer, particularly butyl rubber or the like, slurried in a diluent, is contacted at a temperature level above the boiling point of the diluent with a sufficient amount of an inert solvent boiling above the boiling point of the diluent to volatilize sufficient diluent to dissolve the copolymer in the solvent. The copolymer is then reacted in solution with one or more of the foregoing types of azomonocarboxylate and/or azodicarboxylate compounds at a temperature between about −40° C. and +150° C., preferably between about 0° and 100° C. for a time between about 10 minutes and 50 hours, and even more especially between about 0.5 and 20.0 hours, so as to contain combined therein about 0.1 to 1.0 mole of combined azocarboxylate compound per mole of carbon to carbon double bonds in the rubbery polymer. In other words, the rubbery polymer advantageously contains between about "0.1X" to "X" (preferably between about "0.2X" to "0.6X") weight percent of the azocarboxylate compound, wherein:

$$X = \frac{A(L)}{(100-L)M_1 + L(M_2+A)}(100)$$

and:

$L$ = mole percent of the multiolefin in the copolymer,
$M_1$ = molecular weight of the isoolefin,
$M_2$ = molecular weight of the multiolefin, and
$A$ = molecular weight of the azocarboxylate compound.

The foregoing reaction is advantageously catalyzed by such acid catalysts as sulfuric acid or perchloric acid, and/or metal halides such as boron trifluoride; and/or peroxide catalysts such as cumyl peroxide, tertiary butyl hydroperoxide, hydrogen peroxide, perbenzoic acid, tertiary butyl perbenzoic acid, benzoyl peroxide, or ditertiary butyl peroxide, etc. The modified polymer formed may be recovered from the reaction mixture by contacting the solution of the same with a higher boiling nonsolvent liquid medium such as water at a temperature above the boiling point of the solvent to form a slurry of the modified polymer in water which may be pumped through lines with facility and subsequently freed of water by conventional filtration or especially by degassing extruders.

In still another embodiment of the present invention, isoolefin-multiolefin-containing copolymers, particularly butyl rubber, are improved as to resistivity, elongation and modulus by reacting the copolymer in solution in accordance with the invention in the presence of a Friedel-Crafts catalyst with a minor proportion of a $C_1$ to $C_{10}$ aliphatic or aromatic aldehyde or substances such as polymeric aldehydes or oxygen-containing heterocyclic compounds which, under reaction conditions, form in situ $C_1$ to $C_{10}$ aliphatic or aromatic aldehydes.

Typical aliphatic and aromatic aldehydes or substances which, under reaction conditions form such aldehydes, include, among others, the following: paraformaldehyde, formaldehyde, acetaldehyde, valeraldehyde, benzaldehyde, tolualdehyde, cinnamaldehyde, anisaldehyde, acrolein, crotonaldehyde, trioxane, furfural, phenylacetaldehyde, salicylaldehyde, nitrobenzaldehyde, naphthaldehyde, etc.

In practicing this process in accordance with the present invention, an isoolefin-multiolefin-containing copolymer such as butyl rubber, or the like, is copolymerized in the presence of a non-solvent liquid diluent and subsequently dissolved and modified in solution in accordance with the present invention substantially as described above. The dissolved copolymer is reacted preferably in the presence of a Friedel-Crafts catalyst, with aldehydes at a temperature between about −40° and +150° C., preferably between about 0° and 100° C. for a time between about 2 minutes and 10 hours, preferably between about 5 and 240 minutes, so as to contain therein about 0.05 and 2.0, preferably 0.1 to 1.0, moles of combined aldehyde per mole of double bonds in the rubbery copolymer. In other words, the rubbery copolymer advantageously contains between about "0.1X" to "2.0X" (preferably between about "0.2X" to "1.0X") weight percent of the aldehyde, wherein:

$$X = \frac{A(L)}{(100-L)M_1 + L(M_2+A)}(100)$$

and:

$L$ = mole percent of the multiolefin in the copolymer,
$M_1$ = molecular weight of the isoolefin,
$M_2$ = molecular weight of the multiolefin, and
$A$ = molecular weight of the aldehyde.

In another embodiment of the instant invention, dissolved isoolefin-multiolefin-containing copolymers are chemically modified by reaction while in solution, preferably in the presence of about 1 to 5 or 10 wt. percent of a Friedel-Crafts catalyst, with about 0.5 to 20%, advantageously about 0.8 to 15%, preferably about 1.0 to 10% by weight of an acid anhydride per 100 parts by weight of copolymer. The chemical modification reaction temperature is generally regulated to a level of between about 0° and 150° C., advantageously between about 10° and 100° C. and preferably between about 25° and 75° C. The preferred pressures are between about 1 and 5,000 p.s.i.a., atmospheric pressure being satisfactory. The reaction is continued until the resulting chemically modified copolymer, when vulcanized, exhibits improved extension modulus without substantial sacrifice in other properties.

Typical acid anhydrides suitable for the purposes of the present invention have the general formula:

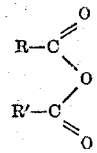

wherein R and R' may be alkyl, aryl, alkaryl, aralkyl, cycloalkyl, alkenyl, alkenaryl, aralkenyl; or halogenated or other derivatives and mixtures thereof. The radicals may contain from 1 to 25 carbon atoms, preferably 1 to 12 carbon atoms or a total of 3 to 27 carbon atoms and 3 to 15 carbon atoms per molecule, respectively. Acid anhydrides that may be used in the practice of this invention are, for example, anhydrides of such acids as acetic acid; chloroacetic acid; bromoacetic acid; fluoroacetic acid; benzoic acid; succinic acid; phthalic acid; p-toluic acid; phenylacetic acid; m-nitrophenyl propionic acid; 2-phenyl butyric acid; p-bromobenzoic acid; dodecanoic acid; phenoxyacetic acid; p-nitrophenyl acetic acid; naphthoic acid; 2,4-dinitrobenzoic acid; anisic acid; diphenic acid; tetrachlorophthalic acid; furoic acid; and naphthenic acid.

It is also within the scope of the present invention to dissolve isoolefin-multiolefin copolymers in solvents and modify the same while in solution by reaction with halogenated multiolefins, preferably halogenated cyclopolyolefins having the general formula $C_nH_{2n-4}$ (prior to halogenation) such as hexafluorocyclopentadiene, hexachlorocyclopentadiene or hexabromocyclopentadiene, or the like. For example, there may be added to the solution of copolymer, formed by replacing an alkyl halide copolymerization diluent with a copolymer solvent, a calculated excess, i.e., about 1 to 2 moles per mole of viscous copolymer, of halogenated, or preferably chlorinated or partially chlorinated cyclopentadiene, cyclohexadiene, etc. and the mixture heated for several minutes up to a day or more at a temperature level of between about 30° and 300° C., advantageously 50° to 200° C., preferably 75° to 150° C. The resulting halogen derivative of the copolymer is then advantageously recovered by stripping out the solvent and unreacted materials at temperatures above their boiling points, generally at a temperature equivalent to about 200° to 300° C. at atmospheric pressure. If the stripping is under vacuum, the temperature may be suitably modified. Recovery may also be in aqueous slurry as more fully outlined above with reference to other chemical modifications of rubbery copolymers. The amount of halogen, such as chlorine, introduced into the polymer is desirably regulated according to the amount of multiolefin in the copolymer, the more the percent of multiolefin, the greater the amount of halogenated cyclodiene permissible and vice versa. Also, carefully controlled amounts of the halogenated cyclodiene such as cyclopentadiene are preferably added to the copolymer so as to combine the foregoing predetermined amount of halogen with said copolymer.

In another preferred embodiment of the present invention, isoolefin-multiolefin-containing copolymers, generally having Staudinger molecular weights between about 3,000 and 300,000 and preferably between about 10,000 and 100,000 and iodine numbers between about 0.5 and 100, preferably between about 1.0 and 80, are improved as to kinematic viscosity and resistivity as more fully described hereinafter. More particularly, about 5 to 95 wt. percent of such copolymers or tripolymers are chemically modified by reaction, while in solution (say dissolved in 1 to 10 volumes of solvent), with about 5 to 95 wt. percent of a polar organic compound, containing oxygen and/or phosphorus and/or especially nitrogen, at temperature levels between about 0° and 250° C., advantageously about 50° to 200° C., and preferably about 75° to 175° C. for about 0.5 to 20 hours and preferably for about 1 to 10 hours. The reaction desirably takes place in the presence of a peroxide-type catalyst such as benzoyl peroxide, tertiary butyl hydroperoxide, hydrogen peroxide, etc., the amount of catalyst used generally being about 0.1 to 2.0 wt. percent based on reactants.

Suitable polar organic compounds containing nitrogen, phosphorus and/or oxygen, useful for modifying isoolefin-multiolefin copolymers in accordance with the invention, include, among others, such nitrogen-containing compounds as acrylonitrile, methacylonitrile, vinyl pyridine and its methyl or other $C_2$ to $C_5$ alkyl derivatives, as well as such oxygen-containing compounds as acrylic esters and methacrylic esters of alcohols of about 1 to 20 carbon atoms. Also of utility are various vinyl ethers such as vinyl isobutyl ether, vinyl esters such as vinyl acetate, various phosphonates such as bis (betachloroethyl) vinyl phosphonate or the like, vinyl triethoxy silane, mixtures thereof, etc.

In another preferred embodiment of the present invention, isoolefin-multiolefin copolymers, particularly butyl rubber, are improved as to resisitivity, modulus, rebound, adhesion to metal and to other rubbery polymers and lack of tack of the final vulcanizate by reacting the copolymer in solution in accordance with the invention with a minor proportion of a non-metallic aromatic halide which is either an aromatic sulfenyl halide and/or an aromatic selenenyl halide of the general formula:

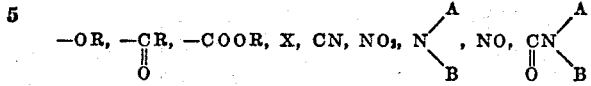

in which X is halogen (preferably chlorine or bromine); D is sulfur or selenium, $F_8$ is a $C_6$ to $C_{30}$, preferably a $C_6$ to $C_{24}$, mono or polynuclear aromatic nucleus such as phenyl, diphenyl, naphthyl, anthracyl, etc., with or without up to about 5 inert $C_1$ to $C_{18}$, preferably $C_1$ to $C_{12}$, alkyl substituents, examples of such nuclei being toluyl; 1,3-dimethyl naphthyl; diphenyl $C_1$ to $C_5$ alkanes such as 1,1-diphenyl $C_1$ to $C_5$ alkanes or a diphenyl nucleus of the general structure

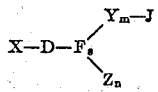

wherein Q is selected from the group consisting of —NH—, —NHCO—, —NHCONH—, —SO₂—,

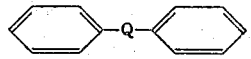

—P=P—, —P=N—, —N=NCONH—, and —N=N—;

Y is alkyl, aralkyl, alkaryl or cycloalkyl; m being 0 to 10 and denoting between about 0 to 10, preferably 1 to 6 carbon atoms; J is selected from the following groups:

$$-OR, -\underset{\underset{O}{\|}}{C}R, -COOR, X, CN, NO_3, N\diagup^A_{\diagdown B}, NO, \underset{\underset{O}{\|}}{C}N\diagup^A_{\diagdown B}$$

$SO_3H$ and $SO_3X$ in which R is hydrogen or a monovalent $C_1$ to $C_{20}$ hydrocarbon radical (e.g., alkyl, aryl, aralkyl, alkaryl or cycloalkyl); X being halogen, A and/or B being R (as above), NO, RNO, OR, ROR, X, RX, CN, RCN, $NO_2$, $RNO_2$, $SO_3H$, $RSO_3H$, $SO_3X$, $RSO_3X$, N=R, RN=NR, N=NOR, N=NCOOR, RN=NCOOR, N=N—$NR_2$ or RN=N—$NR_2$. Several different substituents (Y) may be present in the same sulfenyl halide or selenenyl halide compound, and Z is X, —OH, —$SO_2H$, $SO_3H$, —$NH_2$, $SO_2X$, —NHX, —$NX_2$, —NO, —$NO_2$, —$NHSO_2OH$, —NH—$NR_2$ or

—NH—NH—$NO_2$ n being an integer between about 0 and 4, preferably between about 1 to 3.

Suitable aromatic sulfenyl or selenenyl halides useful for the purposes of the present invention include, among others, the following: benzenesulfenyl chloride, benzenesulfenyl bromide, nitrobenzenesulfenyl chloride, nitrosobenzenesulfenyl bromide, dinitrosobenzenesulfenyl chloride or bromide; dinitrosoarylsulfenyl chlorides; 2,4-dinitrobenzenesulfenyl chloride; chloronitroarylsulfenyl bromides; chloronitrosoarylsulfenyl chlorides; bromonitrosoarylsulfenyl bromides; bromonitrosoarylsulfenyl chlorides; chloronitrosoarylsulfenyl bromides; chloronitrosoarylsulfenyl chlorides; 2,4-dinitrosobenzenesulfenyl chloride or bromide; 2,4-dinitrobenzenesulfenyl chloride or bromide; 4-chloro-2-nitrobenzenesulfenyl chloride or bromide; 4-bromo-2-nitrobenzenesulfenyl chloride or bromide; 2,5-dibromobenzenesulfenyl bromide or chloride; 4-chlorosulfonebenezenesulfenyl chloride or bromide; o-nitrobenzeneselenenyl chloride or bromide; 2,4-dinitrobenzeneselenenyl chloride or bromide; o-nitroanthraceneselenenyl bromide or chloride; 2,5-dichloro-3-methyl-6-hydroxybenzenesulfenyl chloride; 2-hydroxy-5-methylbenzenesulfenyl bromide or chloride; p-acetamidobenzenesulfenyl bromide or chloride; 2-carboxybenezenesulfenyl chloride or bromide; 4-carboxybenzenesulfenyl chloride or bromide; 2-nitro-4-carboxybenzenesulfenyl chloride; 3-carboxybenzensulfenyl chloride or bromide; 4-methyl-2-nitrobenzenesulfenyl chloride; biphenylsulfenyl chloride or bromide; nitrobiphenylsulfenyl chlorides or bromides; chlorobiphenylsulfenyl chloride; chlorosulfonebiphenylsulfenyl chloride; 4-acetamido-1-naphthalenesulfenyl chloride or bromide; 4-acetamido-1-anthracenesulfenyl bromide or chloride; 4-amino-1-anthraquinonesulfenyl bromide or chloride; 4-hydroxy-1-anthraquinonesulfenyl chloride or bromide; 1-anthraquinonesulfenyl chloride or bromide; 2-anthraquinonesulfenyl chloride or bromide; benzothiazolesulfenyl chloride or bromide; and triphenylmethanesulfenyl chloride or bromide.

In practicing this embodiment of the present invention, an isoolefin-multiolefin copolymer such as butyl rubber or the like is produced in accordance with the present invention in the presence of a lower halo-alkane diluent, the diluent-containing polymer slurry formed is discharged into a zone containing sufficient solvent to volatilize the diluent and dissolve the polymer and the resulting polymer is reacted in solution in accordance with the invention with one or more of the foregoing types of aromatic sulfenyl or selenenyl halides at a temperature between about 10° C. and 175° C., preferably between about 25° C. and 80° C. for a time between about 1 minute and 24 hours, preferably between about 0.1 and 6.0 hours so as to contain therein about 0.1 to 1.0 mole of combined sulfenyl or selenenyl halide per mole of double bonds in the original butyl rubber polymer. In other words, the butyl rubber polymer advantageously contains between about "0.1X" to "X" (preferably between about "0.2X" to "0.6X") weight percent of the aromatic sulfenyl or selenenyl halide compound wherein:

$$X = \frac{U(L)}{(100-L)M_1 + L(M_2+U)}(100)$$

and:

$L$ = mole percent of the multiolefin in the copolymer;
$M_1$ = molecular weight of the isoolefin;
$M_2$ = molecular weight of the multiolefin, and
$U$ = molecular weight of the aromatic sulfenyl halide or selenenyl halide.

The foregoing illustrations of various specific chemical agents for modifying isoolefin-multiolefin-containing copolymers in accordance with the present invention are not to be construed as limiting in nature since there are many chemicals not specifically mentioned which may be advantageously reacted in solution with rubbery copolymers of the type disclosed herein and in accordance with the process of the instant invention. For example, unmodified isoolefin-multiolefin-containing rubbery copolymers may be modified by reaction in solution in accordance with the present invention with minor proportions of mercapto-acids, thiol-acids, acid anhydrides, and other polyfunctional compounds having in their structure at least one functional group which is capable of reacting with the copolymer and at least one other functional group which is reactive with another complementary agent or agents such as curatives, bivalent metal oxides or salts, aluminum alkyls and/or alkoxides, polyamines, polyisocyantes, polyisothiocyanates, polybasic acids, polyhydric alcohols, etc.

Referring now in detail to the drawing, there is illustrated by way of example, an apparatus suitable for the process of the present invention. The drawing will be described giving typical ranges of operating conditions generally applicable to the above-described modifications of isoolefin-multiolefin-containing copolymers such as butyl rubber, specific numerical values being recited in parentheses for the production, in accordance with the present invention, of a chlorinated butyl rubber having approximately one atom of chlorine combined in the rubber per mole of carbon to carbon double bonds therein.

In the accompanying drawing, reference numeral 1 designates a polymerization reactor equipped with a stirrer 2 carrying upon a shaft 3. The reactor is surrounded by a heat insulating jacket 4 which is also a refrigerated jacket. The reactor is also equipped with feed inlet conduit 5, catalyst inlet conduit 6 and product outlet line 7. In accordance with the present invention, 6220 lbs. per hour of a polymerizable feed comprising an admixture of about 90 to 99.5 (e.g., 99) wt. percent (i.e., 6000 lbs. per hour) of a $C_4$ to $C_8$ isoolefin (e.g., isobutylene) of at least about 98% (e.g., 99%) purity and about 0.5 to 10.0 (e.g., 1.0) wt. percent (i.e., 220 lbs. per hour) of a $C_4$ to $C_{10}$ conjugated multiolefin (e.g., isoprene) of at least 90% (e.g., 95 wt. percent) purity, is continuously charged to the reactor, along with about 1 to 5 volumes (e.g., 23,700 lbs./hr.) of a $C_1$ to $C_3$ alkyl halide such as methyl chloride (and 2090 lbs./hr. of recycled butylenes) via conduit 5. Simultaneously, a solution of a Friedel-Crafts catalyst, which is preferably an aluminum halide (e.g., 2 lbs./hr. of aluminum chloride) dissolved in a $C_1$ to $C_3$ alkyl halide (e.g., dissolved in 4000 lbs./hr. of methyl chloride) is charged to reactor 1 via conduit 6. The concentration of the aluminum halide catalyst is maintained in the reactor at between about 0.01 to 0.3 weight percent, preferably between about 0.05 to 0.2 weight percent, based on total reactor feed and diluent, by regulation of the amount of recycled alkyl halide diluent to conduit 5 via conduit 8. The conversion of monomers to rubbery copolymer is maintained at about 50 to 99.5%, preferably 60 to 95% (e.g., 75%) by controlling the above feed to catalyst ratio; the polymer product quality being controlled by maintaining the polymerization temperature between about —100° F. to —200° F., preferably between about —120° F. to —160° F. (e.g., —135° F.). The reaction may be carried out either under vacuum, pressure, or atmospheric conditions; the general range being from about 10 to 250 p.s.i.a. (e.g., 30 p.s.i.a.); the pressure being regulated; to be between about 2 to 50 p.s.i. above the pressure in flash drum 53.

After completion of the reaction, a slurry of about 10 to 25 weight percent, preferably about 15 to 20 weight percent of butyl rubber slurried in the alkyl halide (e.g., 36,010 lbs./hr. of a 14.6 wt. percent polymer slurry) is then discharged from the reactor via conduit 7 to flash drum 53 which is fitted with an agitator 16. Flash drum 53 is maintained, as will appear hereinafter, at a temperature sufficiently high to vaporize the alkyl halide and at a pressure between about 2 to 50 p.s.i. below the pressure in reactor 1. Flash drum 53 is also operated at a temperature between about 0° and 250° F., preferably between about 100° to 200° F. (e.g., 152° F.) and at pressures between about atmospheric and about 200 p.s.i.g. (e.g., 50 p.s.i.g.) depending upon the particular alkyl halide being used. Simultaneously, a hydrocarbon liquid (e.g. hexane) having a boiling point above the boiling point of the alkyl halide is injected into flash drum 53 via conduit 9. The hydrocarbon solvent may contain about 0 to 500 p.p.m., preferably about 50 to 200 p.p.m. of water, i.e., just sufficient water to deactivate the catalyst (e.g., 125 p.p.m. of water). Alternatively, a small amount of an oxygenated hydrocarbon such as an alcohol (e.g., isopropanol) can either be blended with the solvent or injected into flash drum 53 to prevent "after" polymerization. As beforementioned, the flash drum is maintained at a lower pressure than the pressure in the reactor. This is to force the slurry of butyl polymer in the alkyl halide from the reactor to the flash drum. Flash drum 53 may be heated by any suitable heat exchange means such as a heating coil in the lower portion of the flash drum (not shown) or the pump-around heat exchange system, as shown, which comprises outlet conduit 10, pump 11, conduit 12, heat exchanger 13 and inlet conduit 14.

The temperature and pressure in the flash drum are regulated whereby to flash off a sufficient amount of the alkyl halide via conduit 15 to cause the butyl rubber copolymer to dissolve at an accelerated rate in the hydrocarbon solvent; about 75 to 100% (e.g., 85%) of the alkyl halide generally being removed. The butyl rubber, dissolved in the hydrocarbon solvent, is drawn off via conduit 10.

At least a portion (e.g., 26,325 lbs./hr.) of a 10 wt. percent butyl rubber solution in n-hexane is then withdrawn for removal of unsaturates and for chemical modification via conduit 17 and/or conduit 21 (e.g., conduit 21) leading to polymer stripper 63 wherein unsaturated materials other than the polymer are removed. The polymer stripper is operated at a temperature of about 80° to 165° C. (e.g., 125° C.) and presssures of about 20 to 150 p.s.i.a. (e.g., 70 p.s.i.a). The heat requirement of polymer stripper 63 is at least partially supplied by indirect steam heat in heat exchanger 64. Under the foregoing conditions, the overhead product in line 65 leaving polymer stripper 63 contains about 2145 lbs./hr. of methyl chloride, 1625 lbs./hr. of hexane, 570 lbs./hr. of isobutylene, and 50 lbs./hr. of isoprene. The bottoms from the polymer stripper leaving via line 68 are essentially free of unreacted monomers and consist principally of about 2632 lbs./hr. of polymer and about 19,300 lbs./hr. of hexane solvent (i.e., about 12 wt. percent solution of polymer).

The overhead products from polymer stripper 63 leaving via conduit 65 are preferably condensed by indirect cooling water in condenser 70 and are fed via line 72, with or without additional recycled solvent from line 74, into fractionating column 66. In this olefin splitter fractionating column, there may be between about 5 and 50 plates or trays (e.g., 25 plates), the heat requirements therefor preferably being supplied by reboiler 78. The bottoms are in this case pumped out conduit 80 by pump 81 into line 82 leading to reboiler 78. After indirect heat exchange with steam in the reboiler, at least a portion of the bottoms is returned to column 66 via line 164. A portion of the bottoms is also optionally employed as recycle to heat exchanger 64 in order to supply at least some of the heat requirements needed in polymer stripper 63. More particularly, in the last-mentioned case, a portion of the bottoms from column 66 are removed from reboiler 78 via line 85, pump 86, and conduit 87 and then fed through heat exchanger 64 into a lower portion of polymer stripper 63. The overhead products leaving fractionating column 66 via line 89 are advantageously condensed in condenser 90 with cooling water and passed through line 91 into settling drum 93 from which drum a portion of the overhead product is returned to the column as reflux, the remaining portion being fed to conventional isoprene and isobutylene extraction units via line 96. The reflux leaves settling drum 93 via conduit 97 and is pumped by pump 98 via line 99 into an upper portion of fractionating column 66. The reflux ratio is generally between about 1 to 1 and about 4 to 1 (e.g., 2 to 1).

The solution of polymer leaves polymer stripper 63 via conduit 68 and is, as beforementioned, substantially free of unsaturated materials other than polymer. This 12 wt. percent solution is fed via line 68 to flash drum 100, where additional hexane is removed via line 102, condenser 103, conduit 104, surge drum 105, line 106, pump 107 and conduit 108 to be either partially or completely recycled (not shown) to conduit 9 leading into alkyl halide flash drum 53. Any hexane which is not thus recycled is normally stored.

The operation of flash drum 100 at a temperature between about 35 and 85° C. (e.g., 70° C.) at a pressure between about 5 and 20 p.s.i.a. (e.g., 15 p.s.i.a.) further concentrates the butyl rubber solution to about 15% by weight. It is, of course, understood that the particular concentration of the butyl rubber in this solution may be varied over a wide range, depending upon the modifying chemicals to be reacted with the rubber in solution, the intended use of the modified reaction product, the desired reaction viscosity, the reaction agitation characteristics, etc. In general, it may be stated that the solution leaving conduit 21 for chemical modification of the polymer dissolved in said solution, is advantageously concentrated, especially for chemically modified rubber cements or latices. In other instances, such as certain halogenation and nitrosylation reactions, the solution may occasionally be diluted prior to reaction with chemicals. However, in the apparatus shown, the butyl rubber solution is concentrated as hereinbefore mentioned to about 15% by weight and is normally pumped out of flash drum 100 via line 120 and pump 121 into conduit 123, leading into storage zone 125 (or leading directly into a zone containing a modifying chemical).

As beforementioned, the foregoing butyl rubber solution may vary in concentration, depending upon certain variables such as solution viscosity. In general, this concentration is between about 5 and 25% by weight (e.g., 15% by weight, supra). This solution is either continuously or periodically pumped from conduit 127 by pump 128 via line 130, optionally through a heating or cooling means (e.g., heat exchanger 132) and then mixed, advantageously in a line or orifice mixer at the desired temperature with a modifying chemical and/or catalyst. Alternatively, the temperature may be regulated in a later stage in the reaction zone or zones. It is also manifestly within the scope of the present invention to introduce the desired modifying chemical directly into the aforesaid reaction zone or zones.

In the apparatus shown, at least one chemical and/or at least one catalytic modifying agent (e.g., 69.5 lbs./hr. of gaseous chlorine) is blended with the polymer solution (substantially at room temperature) by being fed into conduit 136 via modifying agent line 134. This mixture is then advantageously passed to a single reactor or series of reactors, say about 1 to 5, e.g., reactor 138 and reactor 139, which advantageously are fitted with agitators 140 and 141, respectively. After the desired degree of reaction (e.g., to the extent of about 1.30 wt. percent combined chlorine in the polymer) has taken place in the reactors, the reaction mixture is passed out line 143 and pumped by pump 145 through conduit 146 into at least 1 settling means, say about 1 to 5 settling zones such as settler 147 and settler 148. These settlers employed advantageously are continuously charged with circulating wash water. Alternatively, at least one settler may be charged with a neutralizing agent such as dilute caustic or hydrochloric acid followed by water-washing in at least the last settler. In the apparatus shown, settler 147 and settler 148 are both charged with wash water. The modified copolymer is passed through conduit 146 into settler 147 and subsequently out of settler 147 into conduit 149 leading into settler 148. Settler 148 serves to remove traces of unreacted chemicals or neutralizing agents or other undesirable materials which may have become occluded to the modified polymeric reaction product. The substantially pure solution of modified copolymer formed is then passed out settler 148 through line 150, optionally through storage zone 151 and then into line 152.

The resulting solution of modified butyl rubber then passes through line 152, enters flash drum 20 via conduit 19, and is preferably steam atomized by atomizer 24 at a temperature of about 130° to 250° F. (e.g., 170° F.) and under steam atomization pressures of about 20 to 150 p.s.i.g. (e.g., 50 p.s.i.g.). Flash drum 20 is fitted with a water inlet 23 and is equipped with an agitator 25 which facilitates the production and maintenance of a water slurry of the modified butyl rubber polymer. Flash drum 20 is also advantageously operated at about 130° to 250° F. (e.g., 170° F.) at atmospheric pressure up to about 50 p.s.i.g. (e.g., 10 p.s.i.g.). The hydrocarbon (e.g., hexane) is withdrawn via conduit 26 and is recovered as more fully described hereinafter. In an optional but preferred embodiment, low pressure steam (e.g., 35 p.s.i.a.) is also injected into the solvent flash drum 20 via conduit 27. The resulting water slurry of modified butyl rubber in water advantageously contains about 1 to 5 wt. percent of polymer (e.g., 2.0 wt. percent polymer) and is withdrawn from flash drum 20 via conduit 28 to vacuum stripper 29 which is likewise fitted with agitator 30, low pressure (e.g., 35 p.s.i.a.) steam conduit 31. The stripper is advantageously operated at about 120° to 180° F. (e.g., 140° F.), at about 2 to 10 p.s.i.a. (e.g., 4 p.s.i.a.), and serves to remove the last traces of the solvent from the modified butyl rubber-water slurry and return the same to flash drum 20 via conduit 33. This water slurry of modified butyl rubber is then withdrawn via conduit 34 and pumped by pump 35 through conduit 36 to various conventional butyl rubber finishing operations, e.g., filtering, drying, extruding, etc., in which the finishing conditions are carefully controlled, depending upon the particular modification of the butyl rubber. For instance, in producing high molecular weight chlorinated butyl rubber, decreasing the molecular weight breakdown of the final chlorinated rubbery polymer is advantageously accomplished by reducing the severity of milling of the resulting polymer and decreasing the compression, squeezing, pressure and rate of shear in extruding steps to an extent that shearing stresses are decreased from a normal value of about 0.05 to 0.3 horsepower per lb. per hour (for unmodified butyl rubber) to a value of below about 0.03 horsepower per lb. per hour for chlorinated butyl rubber. Furthermore, the viscosity average molecular weight of the resulting chemically modified polymer may be maintained at between about 900,000 and 2,000,000 by controlling the temperature throughout the finishing treatments at below about 300° F. and preferably below about 250° F. (e.g., 220° F.). If a high molecular weight modified rubbery copolymer is not desired, the finishing operations may be relatively more severe and may be performed more rapidly. The remaining finishing operations required to recover the modified copolymer are conventional.

The solvent (e.g., hexane) in accordance with the process of the present invention is recovered from hydrocarbon flash drum 20, operating at the conditions hereinbefore mentioned, via line 26 through condenser 44 to separator 45. In separator 45, the heavier water layer is settled out via conduit 46. Residual alkyl halide (e.g., methyl chloride vapors, if any) (e.g., 50 lbs./hr.) is vented through line 47 either for recycle or disposal, depending upon the purity of the vapor product or other economic considerations. In this case, the alkyl halide vapors are recovered since 4,290 lbs./hr. of methyl chloride, 1,240 lbs./hr. of $C_4$ and $C_5$ monomers, 41,850 lbs./hr. of hexane, and 3,000 lbs./hr. of water vapors are flashed overhead into conduit 26 to be cooled to about 65° to 30° C. (e.g, 48° C. or 118° F.) in condenser 44 and subsequently separated in separator 45. The remaining material emerging via conduit 48 is hydrocarbon solvent containing about 50 to 500 p.p.m. (i.e., parts per million) of water (e.g., 125 p.p.m. of water). This material is passed from conduit 48 through pump 49 and conduit 9 back to the methyl chloride flash drum 53. If the hydrocarbon contains about 20 p.p.m. or more of water, it serves the advantageous function of killing or deactivating the catalyst, as hereinbefore mentioned.

The alkyl halide (e.g., methyl chloride) is recovered via line 15 by optionally compressing the vapors in a first-stage compressor 54 to about 40–60 p.s.i.g. (e.g., 50 p.s.i.g.) discharge pressure, optionally drying the alkyl halide by introducing the same via conduit 55 to alumina drier 56 and again optionally compressing the alkyl halide to about 100–200 p.s.i.g. (e.g., 165 p.s.i.g.), in a second stage compressor 57. Alternatively, the methyl chloride flash drum 53 may, as abovementioned, be maintained under sufficient pressure that the methyl chloride diluent vapors are readily condensed by cooling water in indirect heat exchange therewith, thereby substantially eliminating the necessity of compressor 54 and/or compressor 57. In such a case, while the pressure in the methyl chloride flash drum 53 is at least about 2 to about 50 p.s.i. (e.g., 10 p.s.i.) lower than the pressure in the reactor, the pressure in said flash drum is also regulated to a pressure of at least between about 13 and 200 p.s.i.g. (e.g., about 50 p.s.i.g.) In this latter instance, the alkyl halide, which is preferably methyl chloride (e.g., 53,810 lbs./hr. having a composition of 62% methyl chloride, i.e., 33,367 lbs./hr. of methyl chloride replaced) may be recovered via line 15, conduit 50, condenser 51, line 52, conduit 55, drier 56, conduit 58, second-stage compressor 57, and conduit 38, into fractionating column or tower 37. A portion, say about 0 to 35,000 lbs./hr. (e.g., 21,650 lbs./hr.) of the methyl chloride vapors condensed in condenser 51 may be recycled at temperatures of between about 0° and 45° C. (e.g., 33° C. or 91° F.) via conduit 61 into flash drum 53 in order to enrich the overhead vapors leaving the stream in alkyl halide flash drum 53 via conduit 15. Alternatively, the methyl chloride may be recovered via line 15, conduit 50, condenser 51, line 59, conduit 58, second stage compressor 57, and conduit 38, into fractionating column or tower 37. In any case, the resulting alkyl halide stream such as methyl chloride is introduced into fractionating column or tower 37 via conduit 38. Fractionating column 37 is advantageously fitted with a reboiler as well as conventional overhead condensing auxiliary equipment (not shown) and may contain about 30 to 100 plates (e.g., 60 plates). This column desirably has a reflux ratio of between about 5/1 to about 15/1 (e.g., 8/1). The overhead product leaving via conduit 39 comprises about 5 to 20 weight percent (e.g., 10 weight percent) of the tower feed and is substantially pure alkyl halide (e.g., 4,000 lbs./hr. of highly purified methyl chloride). This overhead product is recycled via overhead conduit 39 to catalyst inlet conduit 6, leading into reactor 1, after having been blended with the desired amount of aluminum halide catalyst (e.g., 2 lbs./hr. of $AlCl_3$) from conduit 40. The bottoms from fractionating column 37 are advantageously fed via conduit 42 into fractionating column 41. This last mentioned fractionating column advantageously contains between about 10 and 40 plates (e.g., 25 plates) and operates generally at a reflux ratio of about 1/1 or 3/1 (e.g., 1.5 to 1). The major proportion of the alkyl halide diluent such as methyl chloride is then withdrawn from fractionating column 41 via overhead conduit 8 (e.g., 23,700 lbs./hr. of methyl chloride and 2090 lbs./hr. of recycled monomers), and is then mixed with fresh monomer to be charged via line 5 to reactor 1. The methyl chloride leaving fractionating column 41 via line 8 contains about 3 to 10 weight percent (e.g., 8 weight percent) of $C_4$ unsaturates such as isobutylene. The bottoms from the fractionating column 41 are then introduced via conduit 43 to a 30 to 70 plate (e.g., 50 plates) stripping column (not shown), from which a small amount of methyl chloride and $C_4$ unsaturates are recovered and recycled to conduit 8. For instance, in the present case the bottoms from column 41 consist of 800 lbs./hr. of $C_4$ olefins (91 weight percent of which is isobutylene), 150 lbs./hr. of $C_5$ hydrocarbons, and 1,470 lbs./hr. of hexane. The stripper bottoms are now substantially free of alkyl halide (e.g., methyl chloride) and comprise additional amounts of $C_4$ hydrocarbons which are conventionally purged therefrom as is known to those skilled in the art.

The stripper bottoms, purged of the aforesaid alkyl halide diluent, such as methyl chloride, then consists predominantly of unreacted olefin (e.g., 800 lbs./hr. of isobutylene) unreacted multiolefin (e.g., 150 lbs./hr. of isoprene) and solvent (e.g., 1470 lbs./hr. of hexane). The unreacted olefin and multiolefin are then recovered (after additional conventional fractionation to split the stream into each respective material) by conventional isoprene and isobutylene extraction units respectively.

The above description of the drawing gives specific operating conditions for the production of chlorinated butyl rubber, in accordance with the present invention. Other examples of improved vulcanized product characteristics obtained when curing butyl rubber which has been modified using specific chemical modifying agents other than chlorine at the reaction conditions specifically recited above for preparing chlorinated butyl rubber, in accordance with the invention, are tabulated as Examples 1 to 7 in Table I, given below, in comparison with chlorinated butyl rubber and a commercial type of unmodified butyl rubber. In each example of the invention, 2632 lbs./hr. of a commercial butyl rubber corresponding to GR-I-25 rubber (i.e., having a mole percent unsaturation of 2.09) are dissolved in n-hexane by replacing 33,362 lbs./hr. of methyl chloride with 23,693 lbs./hr. of n-hexane at the same conditions specified above for the preparation of chlorinated butyl rubber. The modification reaction is carried out in all examples at room temperature, with the amounts of the various types of modifying agents indicated hereinafter. The formulations vulcanized in all examples are as follows:

| Component: | Parts by weight |
|---|---|
| Modified or unmodified polymer | 100 |
| Carbon black (SRF) | 25 |
| Carbon black (MPC) | 25 |
| Zinc oxide | 5.0 |
| Sulfur | 2.0 |
| Tellurium diethyl dithiocarbamate | 1.0 |
| Stearic acid | 0.8 |

The results are reported in Table I.

TABLE I

| Example | Modifying agent Type | M.W. | Lbs./hr. at a molar ratio of modifier to polymer double bond | | Weight percent combined in the polymer at a molar ratio of— | | Physical properties of vulcanizates cured for 50 min. at 307° F. (molar ratio of modifying agent/polymer=1/1) | | | |
|---|---|---|---|---|---|---|---|---|---|---|
| | | | 0.25/1.0 | 1/1 | 0.25/1.0 | 1/1 | Resistivity (ohm-cm.) | Mod. at 300% elong. (p.s.i.) | Tens. (p.s.i.) | Elong. (percent) |
| | Control (no added modifying agent) | | | | | | $1.5 \times 10^{10}$ | 1,200 | >1,500 | >300 |
| 1 | Chlorine | 70.9 | 17.4 | 69.5 | 0.33 | 1.3 | $2.0 \times 10^{14}$ | 1,640 | 3,050 | >300 |
| 2 | Bromine | 159.8 | 39.1 | 156 | 0.70 | 2.4 | $1.5 \times 10^{11}$ | 1,450 | 1,640 | >300 |
| 3 | N-methyl-anthranilic acid (modification of product of Example 1) | 137.1 | 33.6 | 134 | 1.2 | 4.6 | $2.0 \times 10^{12}$ | | 1,820 | |
| 4 | N-4-dinitroso Me aniline | 165.2 | 40.4 | 162 | 1.4 | 5.7 | $2.0 \times 10^{14}$ | 1,300 | 2,040 | >400 |
| 5 | Ethylazodicarboxylate | 174.2 | 42.6 | 171 | 1.5 | 5.5 | $2.0 \times 10^{10}$ | 1,900 | 3,100 | >400 |
| 6 | Formaldehyde | 30.0 | 7.33 | 29.4 | 0.26 | 1.1 | $1.5 \times 10^{12}$ | 1,700 | 2,900 | >400 |
| 7 | 2-nitro-4-carboxy-benzenesulfenyl chloride | 233.6 | 57.2 | 229 | 2.0 | 7.3 | $2.0 \times 10^{14}$ | 2,050 | 3,200 | >400 |

The foregoing examples in Table I show that by practicing the process in accordance with the present invention, rubbery isoolefin-multiolefin-containing copolymers, particularly butyl rubber, may be advantageously dissolved and chemically modified with such chemicals as chlorinating agents (e.g., gaseous chlorine), brominating agents (liquid bromine), azocarboxylates, organic polynitroso compounds, aldehydes, and sulfenyl halides. The advantageous modification of chlorinated butyl rubber with an amino compound containing another functional group, i.e., N-methyl anthranilic acid, is also demonstrated. In all of the foregoing examples, the resulting chemically modified rubbers are improved as to resistivity and also exhibit higher moduli and/or higher tensile strengths with equivalent maximum percent elongations compared to the control. The reaction of the rubber and chemicals is also more complete, the reaction time is less, and the final vulcanizates formed are of better quality than heretofore obtainable. Mixing and compounding of the resulting chemically modified copolymers are also materially improved. Furthermore, both the unvulcanized and vulcanized modified rubbers are more uniform and homogenous and the chemical modification reaction of the rubber with the modifying agent or agents is more easily controlled, especially as to the amount of modifying agent combined with the rubber.

Example 8

Brominated butyl rubber, made essentially in accordance with Example 2 of the present invention, is compared to a commercially available brominated butyl rubber prepared by milling undissolved butyl rubber with a solid brominating agent. The inspections of each rubber is as follows:

TABLE II

| Inspection | Example 8 | Commercial brominated butyl rubber |
|---|---|---|
| Percent bromine | 2.4 | 3.3 |
| Viscosity average molecular weight | 380,000 | 144,000 |
| Gel in diisobutylene | 0 | 26.0 |

The above data show that the brominated butyl rubber of Example 8 of the invention does not gel in diisobutylene and has a considerably higher molecular weight than that of the commercial brominated butyl rubber.

One hundred parts by weight of each rubber are then compounded into the following formulation:

Component: Parts by weight
Carbon black (S.R.F.) _____ 50
Zinc oxide _____ 5.0
Sulfur _____ 2.0
Tetramethyl thiuram disulfide _____ 0.5
Benzothiazyl disulfide _____ 0.5
Stearic acid _____ 0.5

Each resulting compounded rubber stock is then cured for 60 minutes at 307° F., their physical inspections being as follows:

TABLE III

| Inspection | Example 8 | Commercial brominated butyl rubber |
|---|---|---|
| Tensile strength (p.s.i.) | 1,730 | 1,370 |
| Elongation (percent) | 325 | 370 |
| Modulus at 300% elong. (p.s.i.) | 1,700 | 1,150 |

The above data show that the brominated butyl rubber of Example 8 of the invention, when vulcanized, exhibits improved tensile strength and extension modulus without significant loss in elongation, compared to the commercial brominated butyl rubber made by milling a solid brominating agent with undissolved butyl rubber.

Example 9

A commercial butyl rubber corresponding to GR–I–18 rubber (i.e., having a mole percent unsaturation of 1.75) is dissolved in benzene by replacing 33,400 lbs./hr. of methyl chloride with 14,300 lbs./hr. of benzene at the same conditions specified above for the preparation of chlorinated butyl rubber. Ten thousand lbs./hr. of the resulting solution are then contacted with sufficient p-nitrosophenol (freshly recrystallized) to correspond to 1.0 part by weight per part by weight of butyl rubber copolymer. The mixture formed is then refluxed for 1.0 hour at the boiling point of benzene. The solution is then cooled to room temperature and recovered by the same procedure specified above for the preparation of chlorinated butyl rubber.

The original unmodified rubber and the p-nitrosophenol-modified rubber are then each compounded as follows:

Component: Parts by weight
Rubber _____ 40.0
Carbon black (M.P.C.) _____ 20.0
Zinc oxide _____ 2.0
Sulfur _____ 0.6
Tetramethyl thiuram disulfide _____ 0.4
Benzothiazyl disulfide _____ 0.2
Stearic acid _____ 0.4
Plasticizer oil [1] _____ 4.0

[1] The plasticizer oil is an aromatic petroleum hydrocarbon oil derived from a naphthenic base crude oil and having the following characteristics:

Boiling range (° F.) _____ 612–760
Flash point, open cup (° F.) _____ 355
Specific gravity _____ 0.89
Aniline point (° F.) _____ 191
Viscosity @ 100 S.S.U. _____ 110
Viscosity @ 210 S.S.U. _____ 39.5

The compounded stocks are then vulcanized for 45 minutes at 307° F., the following physical properties being noted:

| Property | Unmodified rubber | p-Nitrosophenol modified rubber |
|---|---|---|
| Modulus at 300% elong. (p.s.i.) | 750 | 1,200 |
| Tensile strength (p.s.i.) | >2,000 | 2,850 |
| Elongation (percent) | >400 | 630 |

The above data show that butyl rubber which has been chemically modified in accordance with the present invention, when vulcanized, exhibits superior extension modulus, tensile strength and elongation compared to the unmodified control.

*Examples 10–12*

The same general procedure as in Example 9 is repeated, except that in all examples the rubber being modified is a commercial rubber corresponding to GR–I–25. In the instant examples, the nitrosophenol is reacted in a ratio of 0.85 gram per gram of rubbery copolymer. Examples 11 and 12 essentially repeat Example 10, replacing benzene as the rubber solvent with chloroform and toluene, respectively. The reaction temperatures used are 60° C., 60° C., and 110° C., respectively. The products, upon recovery by the same procedure specified above for the preparation of chlorinated butyl rubber, showed the following analyses:

| | Example 10 | Example 11 | Example 12 |
|---|---|---|---|
| Nitrogen combined (weight percent) | 0.068 | 0.037 | 0.240 |
| Weight percent of amount added | 14.58 | 7.93 | 51.3 |

Resort may be had to various modifications and variations of the disclosed specific embodiments and examples without departing from the spirit of the invention or the scope of the appended claims.

What is claimed is:

1. In the continuous process for making and recovering a rubbery polymer of a major proportion of a $C_4$ to $C_7$ isoolefin with a minor proportion of a $C_4$ to $C_{14}$ multiolefin made by continuous Friedel-Crafts polymerization in a diluent consisting of insert $C_1$ to $C_3$ alkyl halide diluent which is a first non-solvent for the polymer therefrom, whereby there is continuously produced a polymerization reaction first slurry dispersed in a liquid medium consisting essentially of said alkyl halide diluent, the improvement which comprises; contacting said first slurry at a temperature above the boiling point of said diluent with a $C_5$ to $C_{10}$ liquid hydrocarbon solvent for the polymer to volatize said diluent therefrom and to directly dissolve polymer therein while maintaining the temperature between 20 and 100° C., said solvent boiling above the boiling point of said diluent; reacting the polymer in solution chemically by incorporating into said solution a material selected from the group consisting of sulfenyl halides, selenenyl halides, n-nitroso-p-nitroso alkyl aniline, azomonocarboxylates, azodicarboxylates, $C_1$ to $C_{10}$ aliphatic aldehydes, $C_1$ to $C_{10}$ aromatic aldehydes, a halogen and mixtures thereof; contacting said solution having said chemically reacted polymer therein with a second non-solvent aqueous liquid medium at a temperature above the boiling point of said solvent to volatize solvent therefrom and to form a second slurry of copolymer in said second non-solvent, said second non-solvent boiling above the boiling point of said solvent; and subsequently recovering said reacted polymer from said second slurry.

2. In the continuous process for making and recovering a rubbery polymer of a major proportion of a $C_4$ to $C_7$ isoolefin with a minor proportion of a $C_4$ to $C_{14}$ multiolefin made by continuous Friedel-Crafts polymerization in a diluent consisting of inert $C_1$ to $C_3$ alkyl halide diluent which is a first non-solvent for the polymer therefrom, whereby there is continuously produced a polymerization reaction first slurry dispersed in a liquid medium consisting essentially of said alkyl halide diluent, the improvement which comprises; contacting said first slurry at a temperature above the boiling point of said diluent with a $C_5$ to $C_{10}$ liquid hydrocarbon solvent for the polymer to volatize said diluent therefrom and to directly dissolve polymer therein while maintaining the temperature between 20 and 100° C., said solvent boiling above the boiling point of said diluent; reacting the polymer in solution chemically by adding a halogen into said solution at a temperature between 0 and 100° C. to incorporate combined halogen in its structure by essentially a substitution reaction; contacting said solution having said chemically reacted polymer therein with a second non-solvent aqueous liquid medium at a temperature above the boiling point of said solvent to volatize solvent therefrom and to form a second slurry of copolymer in said second non-solvent, said second non-solvent boiling above the boiling point of said solvent; and subsequently recovering said reacted polymer from said second slurry.

3. The process according to claim 1 in which the compound to chemically react with the rubber is a sulfenyl halide.

4. The process according to claim 1 in which the compound to chemically react with the rubber is n-nitroso-p-nitroso alkyl aniline.

5. The process according to claim 1 in which the compound to chemically react with the rubber is a azomonocarboxylate.

6. The process according to claim 1 in which the compound to chemically react with the rubber is a $C_1$ to $C_{10}$ aliphatic aldehyde.

7. The process according to claim 1 in which the compound to chemically react with the rubber is chlorine.

8. The process according to claim 1 in which the compound to chemically react with the rubber is bromine.

References Cited in the file of this patent

UNITED STATES PATENTS

| | | |
|---|---|---|
| 2,292,737 | Blomer et al. | Aug. 11, 1942 |
| 2,376,027 | Bouchard | May 15, 1945 |
| 2,537,627 | Weissert et al. | Jan. 9, 1951 |
| 2,616,876 | Rehner et al. | Nov. 4, 1952 |
| 2,631,984 | Crawford et al. | Mar. 17, 1953 |
| 2,732,354 | Morrissey et al. | Jan. 24, 1956 |
| 2,891,595 | Kuntz et al. | June 23, 1959 |